United States Patent [19]

Minegishi et al.

[11] Patent Number: 4,843,911
[45] Date of Patent: Jul. 4, 1989

[54] SPEED REDUCING OR INCREASING PLANETARY GEAR APPARATUS

[75] Inventors: Kiyoji Minegishi, Aichi; Toshihiro Ishida, Obu, both of Japan

[73] Assignee: Sumitomo Heavy Industries, Ltd., Tokyo, Japan

[21] Appl. No.: 180,518

[22] Filed: Apr. 12, 1988

[30] Foreign Application Priority Data

Apr. 13, 1987 [JP] Japan .................................. 62-88685

[51] Int. Cl.[4] ............................................. F16H 1/28
[52] U.S. Cl. .................................. 74/801; 74/750 R
[58] Field of Search ............ 74/797, 801, 804, 750 R; 384/584, 585, 537

[56] References Cited

U.S. PATENT DOCUMENTS 3,405,982  10/1968  Krenn ................................. 384/537

FOREIGN PATENT DOCUMENTS

| 2358827 | 2/1975 | Fed. Rep. of Germany | 74/804 |
| 117940 | 7/1984 | Japan | 74/804 |
| 60-146939 | 8/1985 | Japan . | |
| 61-38242 | 2/1986 | Japan . | |
| 587607 | 4/1947 | United Kingdom | 74/804 |

Primary Examiner—Dwight G. Diehl

Attorney, Agent, or Firm—Armstrong, Nikaido, Marmelstein, Kubovcik & Murray

[57] ABSTRACT

A planetary gear apparatus includes: an external gear mounted on an input shaft with an eccentric member and a bearing fitted onto the eccentric member therebetween; an internal gear engaging with the external gear, the internal gear being coaxial with respect to the input shaft; an output shaft for outputting a reduced rotational force; and a drive for coupling the external gear and the output shaft. The planetary gear apparatus is adapted to transmit the rotational force of the input shaft to the output shaft after it has reduced the speed thereof, or to transmit the rotational force of the output shaft to the input shaft after it has increased the speed thereof, by fixing the internal gear. The external gear has a ring-like shape. The inner peripheral surface of the external gear is provided with a hole into which the bearing that is fitted on the eccentric member is fitted, and splines are formed on the insertion hole over the entire external gear in such a manner that they are coaxial with respect to the external gear. The bearing having a width shorter than that of the splines is fitted into one end side of the bearing insertion hole, and the drive having an end provided with splines is engaged with the other end side of the bearing insertion hole. The other end of the drive is provided with splines or spline grooves which are engaged with spline grooves or splines provided in the output shaft.

1 Claim, 6 Drawing Sheets

F I G. 2
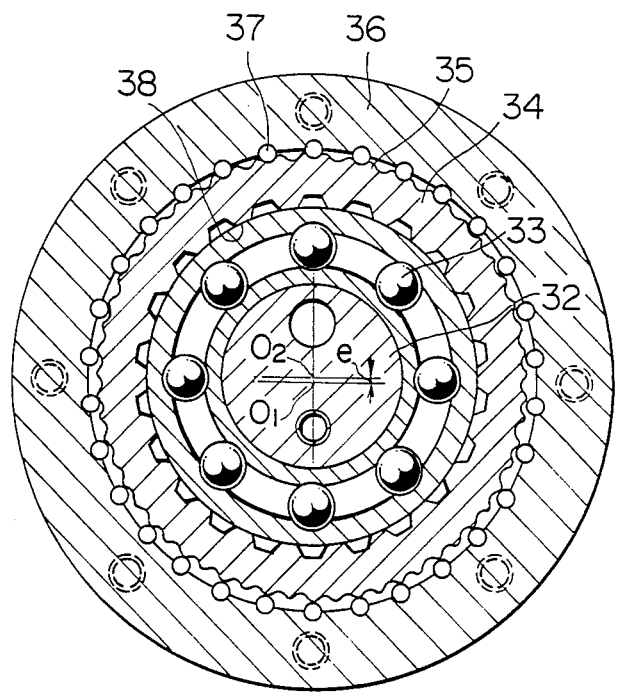

SPEED REDUCING OR INCREASING PLANETARY GEAR APPARATUS

BACKGROUND OF THE INVENTION

1. Field of the Invention

The present invention relates to an improvement in a planetary gear apparatus including an internal gear having inner teeth which are constituted by pins or a combination of pins and rollers, and an external gear having trochoidal or arcuate outer teeth. More particularly, the present invention pertains to a planetary gear mechanism which is simplified at the output side thereof.

2. Description of the Related Art

A typical conventional planetary gear apparatus will first be described hereinunder with reference to FIGS. 3 and 4.

This planetary reduction gear is of a type in which a rotational force input to an input shaft 1 is transmitted to an output shaft 2 after its rotational speed has been reduced.

The mechanism for reducing the speed is as described below.

Eccentric members $3_1$ and $3_2$ are provided on the input shaft 1 at a predetermined phase difference (180° in this embodiment). The eccentric members $3_1$ and $3_2$ are respectively in contact with external gears $5_1$ and $5_2$ through bearings 4. Each of the external gears $5_1$ and $5_2$ is provided with a plurality of inner roller bores 6, and an inner pin 7 and an inner roller 8 are fitted into each of the bores 6. The outer periphery of each of the external gears $5_1$ and $5_2$ is toothed in a trochoidal or arcuate form so as to form trochoidal or arcuate outer teeth 9. The outer teeth 9 engage with outer pins 11 provided on an internal gear 10.

The inner pins 7 are shrink fitted into a flange 12 of the output shaft 2.

In this known art, when the input shaft 1 rotates one revolution, the eccentric members $3_1$ and $3_2$ also rotate one revolution, but the external gears $5_1$ and $5_2$ are prevented from self rotating because of the engagement of the inner pins 7 with the inner roller bores 6. Therefore, in a case where the difference between the number of teeth of each of the external gears $5_1$ and $5_2$ and the number of outer pins 11 (acting as inner teeth) is one, while the input shaft 1 is rotating one revolution, the outer teeth 9 of each of the external gears $5_1$ and $5_2$ are displaced (are shifted) relative to the outer pins 11 of the internal gear 10 which constitute the inner teeth thereof by one tooth. In consequence, one revolution of the input shaft 1 is reduced to a factor which is the reciprocal of the number of teeth of each of the external gears $5_1$ and $5_2$, and the rotational force whose speed has been thus reduced is then transmitted to the output shaft 2 through the inner pins 7.

The planetary gear apparatus of the above-described type, however, retains the following disadvantages.

In a case where a power transmission mechanism constituted by the inner roller bores 6, the inner pins 7, and the inner rollers 8 is employed to transmit the rotational force, the flange 12 must be rigid enough to prevent the output shaft 2 from becoming deformed. For this reason, the size of members or portions near the output shaft 2 cannot be reduced in the diametrical direction of the shaft 2.

This power transmission mechanism requires highly accurate machining, and must also have a suitably high rigidity, since any slight deformation of a member or portion thereof has an adverse effect on the operation.

Further, the inner roller bores 6 occupy a relatively large space in each of the external gears $5_1$ and $5_2$, and hinder any reduction in the size of the external gears $5_1$ and $5_2$ and, hence, in the size of the overall apparatus.

FIG. 5 shows another known planetary gear mechanism (see the specification of copending U.S. Application Ser. No. 83901) filed Aug. 6, 1987, now U.S. Pat. No. 4,770,062. In this mechanism, a carrier 22 is mounted on an external gear 21. The carrier 22 is provided with spline grooves 22A, and the output shaft 23 is provided with spline grooves 23A. These spline grooves 22A and 23A are coupled by a drive 23 having splines 24A at opposite ends thereof, by which radial load is prevented from acting on the output shaft. However, the external gear 21 of this apparatus has a complicated shape, and it is therefore difficult to machine a large number of external gears 21 which are laid on top of another at one time. The external gear 21 and the carrier 22 must be machined in two separate processes. Since the spline grooves 22A are formed in the carrier 22, the pitch diameter of the drive 24 coupled to the spline carrier 22 is inevitably reduced. This requires that the external gear 21 and the drive 24 are subjected to carburization so as to enable the strength thereof to be increased, increasing the production cost.

FIG. 6 shows still another known planetary gear apparatus (see the specification of Japanese Patent Laid-Open No. 60-146939). This apparatus is arranged such that an arm-shaped carrier 26 is mounted on an external gear 25, and that the carrier 26 and an output shaft 27 are coupled by a drive 28. In this apparatus, machining of the external gear 25 is easy. However, a large space for the carrier 26 is required, and the size of the external gear 25 cannot be therefore reduced by a satisfactory degree in the diametrical direction thereof. Further, since the external gear 25 and the carrier 26 are two separate units, the number of parts is increased, making management of the parts difficult.

SUMMARY OF THE INVENTION

In view of the problems of the prior art, an object of the present invention is to provide a planetary gear apparatus which has a simple structure but is reduced in size as well as in the axial and radial lengths.

To this end, the present invention provides a planetary gear apparatus including: an external gear mounted on an input shaft with an eccentric member and a bearing fitted onto the eccentric member therebetween; an internal gear engaging with the external gear, the internal gear being coaxial with respect to the input shaft; an output shaft for outputting a reduced rotational force; and a drive for coupling the external gear and the output shaft, the planetary gear apparatus being adapted to transmit the rotational force of the input shaft to the output shaft after it has reduced the speed of the rotational force, or to transmit the rotational force of the output shaft to the input shaft after it has increased the speed of the rotational force, by fixing the internal gear, characterized in that the external gear has a ring-like shape, that the inner peripheral surface of the external gear is provided with a hole into which the bearing fitted on the eccentric member is fitted, that splines are formed on the insertion hole over the entire axial length of the external gear in such a manner that they are coaxial with respect to the external gear, that the bearing is fitted into one end side of the bearing insertion hole, the bearing having a length shorter than that of each of the splines, that the drive having an end provided with splines is engaged with the other end side of the bearing insertion hole, that the other end of the drive is provided with splines or spline grooves, and that the splines or the spline grooves are engaged with spline grooves or splines provided in the output shaft.

With the above-described arrangement, the rotational force of the input shaft is directly transmitted to the output shaft by means of the universal joint of the drive, by which the above-described problems of the prior art can be overcome.

The present invention will be described hereinunder in detail with reference to the accompanying drawings.

BRIEF DESCRIPTION OF THE DRAWINGS

FIG. 2 is a sectional view taken along the line II—II of FIG. 1;

DESCRIPTION OF THE PREFERRED EMBODIMENTS

Figure 1:
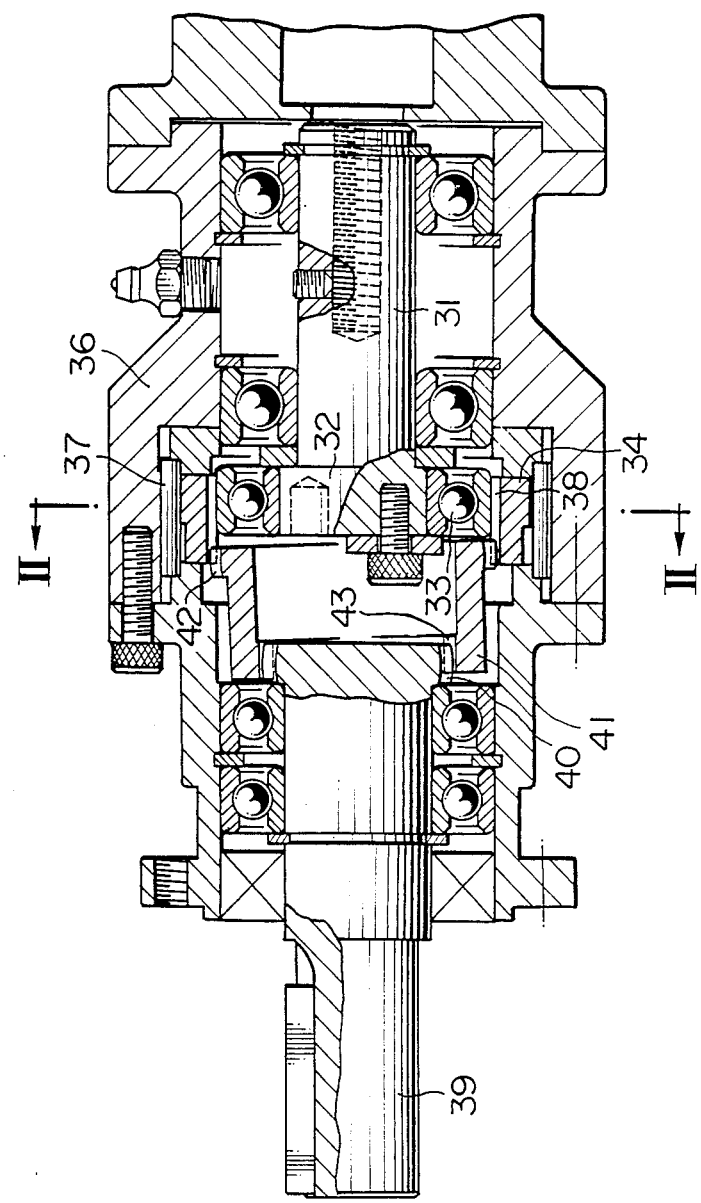
FIG. 1 is a sectional view of one embodiment of the present invention.
Figure 3:
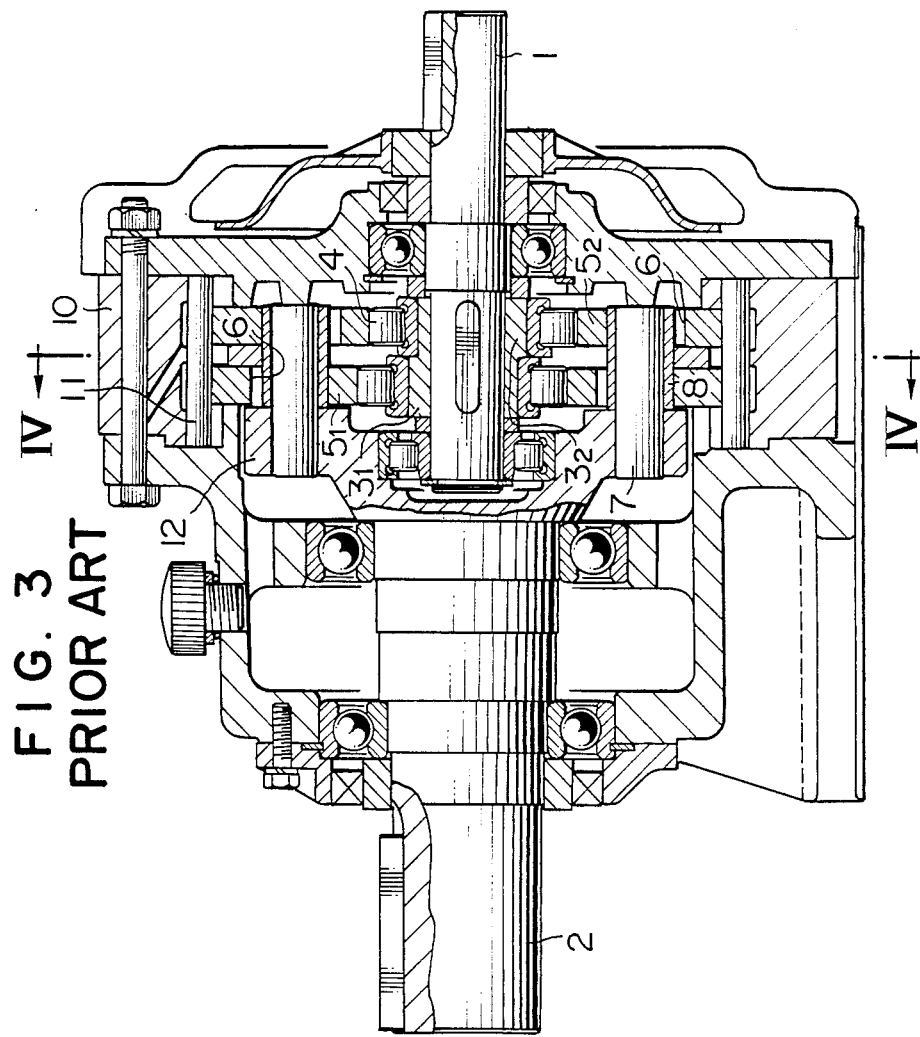
FIG. 3 is a sectional view of one example of known planetary reduction gears.
Figure 4:
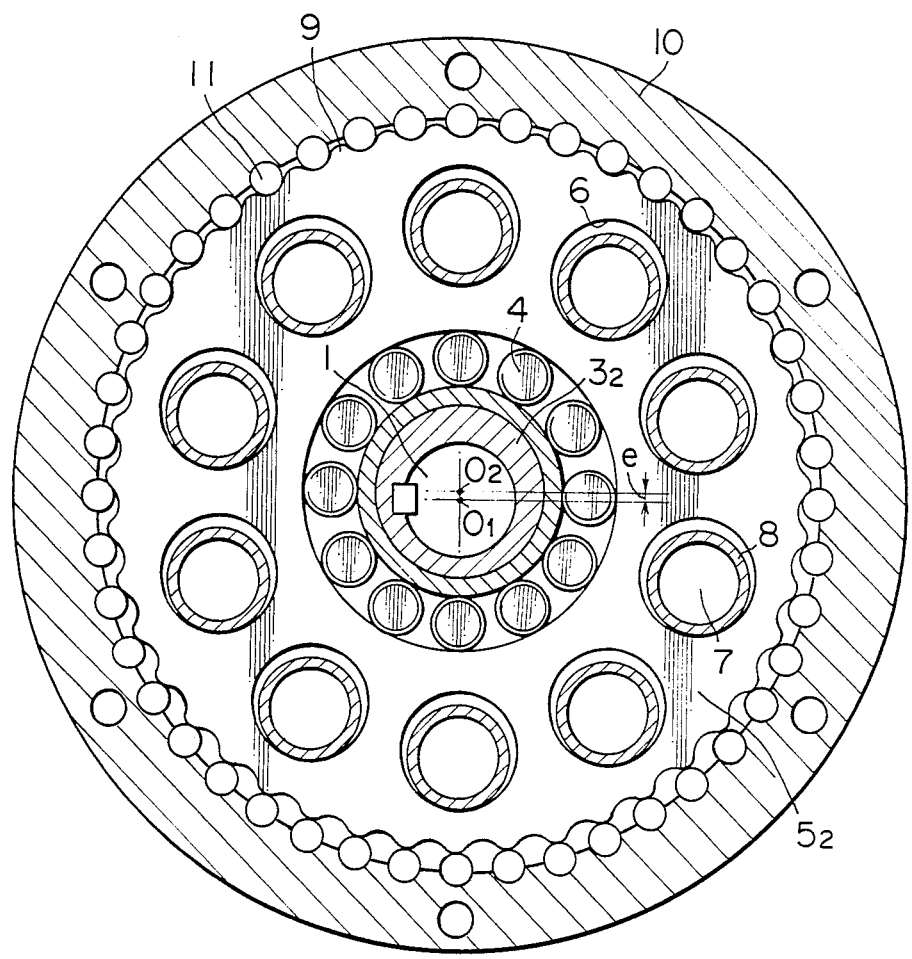
FIG. 4 is a sectional view taken along the line IV—IV of FIG. 3.
Figure 5:
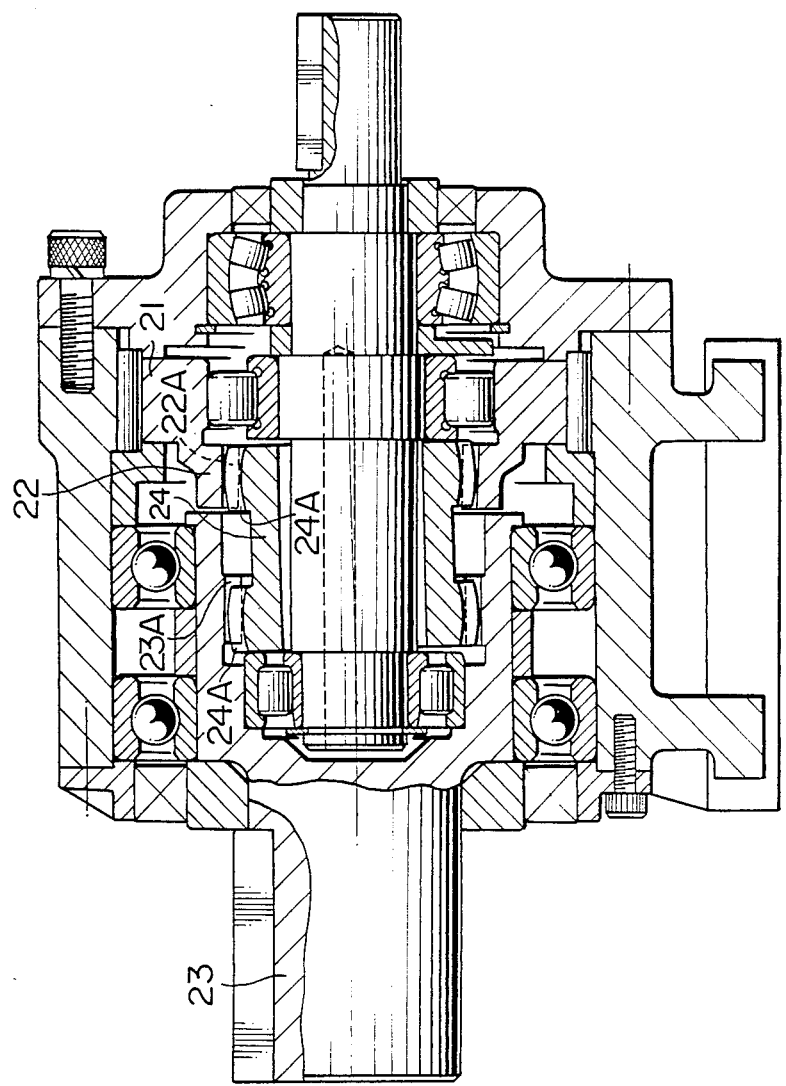
FIG. 5 is a sectional view of a known planetary reduction gear employing a drive.
Figure 6:
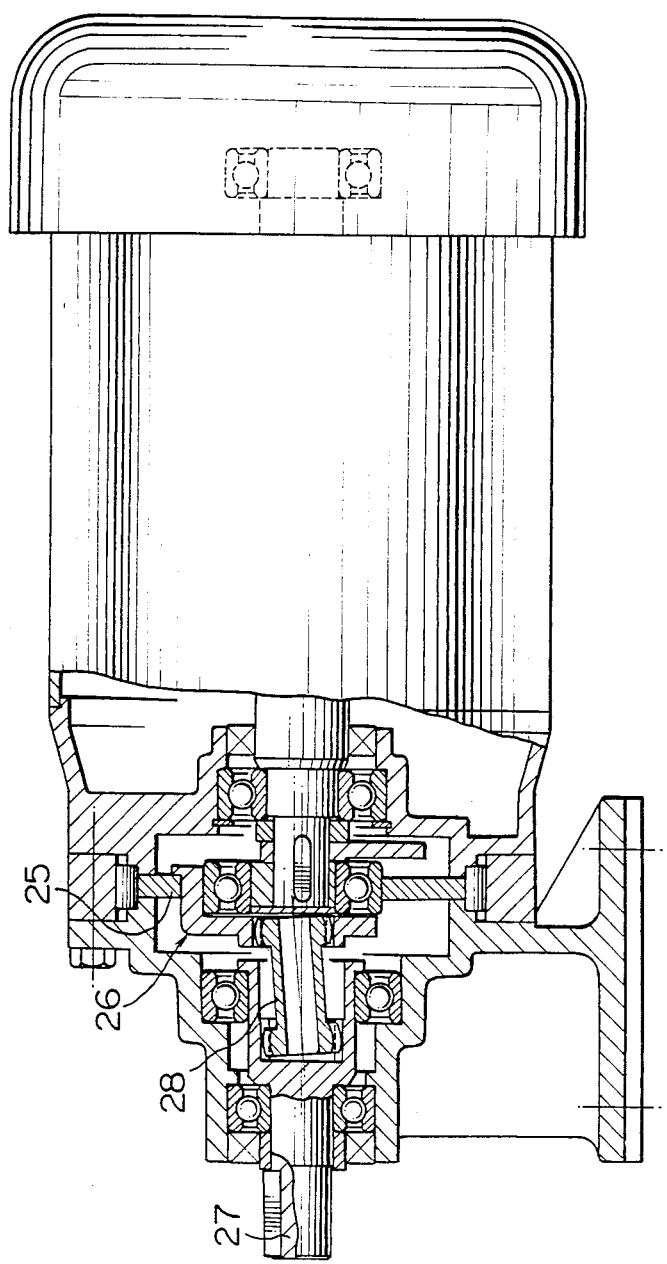
FIG. 6 is a sectional view of another known planetary reduction gear employing a drive.

Referring to FIGS. 1 and 2, which show in combination one embodiment of the present invention, an eccentric member 32 is fixed to an input shaft 31, and a ring-shaped external gear 34 is mounted on the eccentric member 32 with a bearing 33 therebetween. The axis $O_2$ of the external gear 34 is offset relative to the axis $O_1$ of the input shaft 31 (an internal gear 36) by e. The external gear 34 is toothed in a trochoidal or arcuate form so as to form trochoidal or arcuate outer teeth 35. The outer teeth 35 engage with the internal gear 36 whose inner teeth are constituted by outer pins 37. The external gear 34 is provided with a spline hole 38 which serves as a hole into which the bearing fitted on the eccentric member is inserted and which is coaxial with respect to the outer teeth 35. The bearing 33 is directly fitted into the spline hole 38.

An output shaft 39 is provided with splines 40 which are coaxial with respect to the input shaft 31. A floatingly supported drive 41 extends between the spline hole 38 and the splines 40. The drive 41 is cylindrical, and has splines 42 fitted into the spline hole 38 at one end thereof as well as spline grooves 43 coupled to the splines 40 at the other end thereof.

The operation of the thus-arranged planetary gear apparatus of the present invention will be described below.

The rotational force input to the input shaft 31 makes the eccentric member 32 rotate, and is then transmitted through the bearing 33 to the external gear 34. At that time, the axis $O_1$ of the input shaft 31 and the rotational axis $O_2$ of the external gear 34 are shifted by e, and the external gear 34 is coupled to the floatingly supported drive 41. The revolution of the external gear 34 about the axis $O_1$ of the input shaft 31 is therefore absorbed by the floating movement of the drive 41, and only the rotation of the input shaft 31 is transmitted to the external gear 34 after its speed has been reduced to a factor which is the reciprocal of the number of outer teeth (if the difference between the number of outer teeth and the number of outer pins is one), because of the engagement of the external gear 34 with the outer pins 37. The rotational force of the external gear 34 is then transmitted to the drive 41, and the output shaft 39 is rotated by the drive 41.

In the above-described embodiment, the splines of the output shaft 39 are fitted into the spline grooves formed in the drive 41. However, the splines and spline grooves may be formed on the drive and the output shaft to couple the drive 41 and the output shaft 39.

In the above-described embodiment, the planetary gear apparatus acts as a reduction gear. However, it is clear that it may also be used as a speed-increasing gear, if the input and output shafts are reversed.

The thus-arranged planetary gear apparatus of the present invention has the following advantages:

Since machining errors can be absorbed by the drive that is moved in a floating manner with respect to the external gear and the output shaft, it is not necessary to prepare individual parts with a high degree of accuracy.

Since the hole into which the bearing that is fitted onto the eccentric member is fitted serves as a spline hole, the pitch diameter of the drive can be made larger, and a larger number of outer teeth can be formed. As a result, the load applied to the outer teeth that are in contact with the inner teeth is reduced, and the external gear and the drive therefore need not be subjected to carburization.

The planetary gear apparatus of the present invention requires no inner roller hole or space for a carrier. Therefore, the size thereof can be reduced in the radial direction as well as in the axial direction.

No radial load acts on the output shaft, so transmission errors caused by the deformation thereof can be reduced.

Further, since the external gear has no shoulder for a carrier, it can be easily machined, reducing the production cost thereof.

What is claimed is:

1. A planetary gear apparatus including: an external gear mounted on an input shaft with an eccentric member and a bearing fitted onto said eccentric member therebetween; an internal gear engaging with said external gear, said internal gear being coaxial with respect to said input shaft; an output shaft for outputting a reduced rotational force; and a drive for coupling said external gear and said output shaft, said planetary gear apparatus being adapted to transmit the rotational force of said input shaft to said output shaft after it has reduced the speed of said rotational force, or to transmit the rotational force of said output shaft to said input shaft after it has increased the speed of said rotational force, by fixing the internal gear, characterized in that said external gear has a ring-like shape, that the inner peripheral surface of said external gear is provided with a hole into which said bearing that is fitted onto said eccentric member is fitted, that splines are formed on said insertion hole over the entire axial length of the external gear in such a manner that they are coaxial with respect to said external gear, that said bearing is fitted into one end side of said bearing insertion hole, said bearing having a width shorter than that of each of said splines, that said drive having an end provided with splines is engaged with the other end side of said bearing insertion hole, that the other end of said drive is provided with splines or spline grooves, and that said splines or said spline grooves are engaged with spline grooves or splines provided in said output shaft.

* * * * *